UNITED STATES PATENT OFFICE.

NIELS C. CHRISTENSEN, OF SALT LAKE CITY, UTAH, ASSIGNOR OF ONE-HALF TO J. E. BARLOW, OF HABANA, CUBA, AND ONE-HALF TO BIG INDIAN COPPER CO., OF UTAH.

PROCESS OF TREATING COPPER ORES BY LIXIVIATION.

1,278,854.

Specification of Letters Patent. Patented Sept. 17, 1918.

No Drawing. Application filed September 1, 1916. Serial No. 118,156.

*To all whom it may concern:*

Be it known that I, NIELS C. CHRISTENSEN, a citizen of the United States, residing at Salt Lake City, in the county of Salt Lake and State of Utah, have invented new and useful Improvements in Processes of Treating Copper Ores by Lixiviation, of which the following is a specification.

This invention relates to the art of treating copper ore for recovery of the copper, more particularly to an improved process involving the lixiviation of copper ore by means of a solution of sulfur dioxid, $SO_2$ in water.

The primary object in view is to overcome the difficulties which have made failures of prior attempts to utilize a water solution of $SO_2$ on a commercial scale for the treatment of oxidized copper ore, and thereby to make the use of this solvent possible in a simple, cheap, efficient and exceedingly valuable process.

The accompanying drawing illustrates diagrammatically the several steps and apparatus employed in carrying out my invention, the novel features of which are particularly pointed out in the claims at the end of the specification.

Prior to my invention, it has been generally known by those skilled in the art, that a water solution of $SO_2$ dissolves the oxidized compounds of copper, and that, on boiling off the excess $SO_2$ from the solution containing the copper, part of the copper is precipitated as the red cupro-cupric sulfite, $Cu_2SO_3.CuSO_3$ and the remainder of the copper is left in solution as copper sulfate, $CuSO_4$. While a number of attempts have been made to utilize these facts for the treatment of copper ore on a commercial scale, they have all failed for the reason that none of the vital elements and none of the essential facts necessary to the use of $SO_2$ solution as a solvent for the commercial treatment of copper ore have ever been discovered. Consequently, no efficient or complete process for the treatment of copper ore in this manner has ever been worked out.

The present invention is the result of a discovery of these essential facts and vital elements and as a result provides a process wherein the treatment of copper ore with $SO_2$ solution for the recovery of the copper may be carried out on a commercial scale and which results in a recovery of practically the entire copper content of the ore.

In describing the invention, the essential features thereof will first be set forth, following the order of the several steps of the process, and, next, a description of the process as an entirety will be given.

*The use of a concentrated $SO_2$ solution.*

In lixiviating, it is, as I have ascertained, absolutely essential for commercial purposes to employ a concentrated $SO_2$ solution. A concentrated $SO_2$ solution is necessary in order to secure rapid solution of the copper, to prevent reprecipitation and the formation of much $CuSO_4$ and to obtain a relatively strong copper solution. That these requirements can be met only by the use of a concentrated $SO_2$ solution is apparent from a statement of the following facts:—First, the time required for the solution of the copper is proportionate to the strength of the solution. Second, if a dilute solution is used, much reprecipitation occurs in the pulp and $CuSO_4$ is formed according to the following reaction:

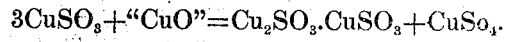

$3CuSO_3 + $ "$CuO$" $= Cu_2SO_3.CuSO_3 + CuSO_4$.

Third, the amount of copper which will go into solution, relatively small at best, is proportionate to the $SO_2$ content of the solution, for example: a 6% $SO_2$ solution will hold about 2.6% copper; a 5% $SO_2$ solution about 2% copper; and a 2% $SO_2$ solution a little over 1% copper.

From the above, it will be obvious that a failure to use a relatively concentrate $SO_2$ solution will produce a failure in the process for the lixiviation of the copper ore. Concentrated $SO_2$ solutions have heretofore never been obtained because of the neglect or lack of knowledge of the principles underlying the absorption of gases. In order to secure an efficient absorption of $SO_2$ large enough towers or other absorption apparatus must be used and also a sufficient volume of solution. While these present no serious difficulties, the maximum strength of solution which may be secured in a tower or other absorption apparatus is, however, not determined to any great extent by the efficiency of the apparatus. On the other hand, the strength of the solution depends almost entirely upon the percentage of $SO_2$ in the gas supplied to the tower and is directly proportional to the partial pressure of $SO_2$ in the gas entering the tower, i. e., if a 6% $SO_2$ gas, by volume, is supplied to the absorber a solution carrying only 6% of maximum strength of solution made from pure $SO_2$ gas could be obtained. For example, with the water at 20 C. and using pure $SO_2$ gas, a solution carrying about 12% $SO_2$ may be secured, but if the gas carry only 18% $SO_2$ (i. e., the richest gases from a sulfur burner) a solution carrying a little over 2% might be secured, while, if a 6% $SO_2$ gas be used (for example, the gases from a roasting furnace) a solution carrying about .7% might be obtained.

From the above, it is obvious that the process cannot be made a success by applying only dilute roaster gas to the solution, as has been attempted. Relatively strong solutions necessarily cannot be secured from relatively dilute gases in any absorption apparatus. I have ascertained that, in order to secure a strong solution of $SO_2$, the dilute gases must first be absorbed in a tower or other absorption apparatus to form a weak solution and this weak solution must then be enriched in other towers or absorbers to which richer gases are supplied. This is one of the important elements of the process of obtaining a relatively concentrated $SO_2$ solution and said process is carried out as follows in the case in which three towers or absorbers are used.

As shown in the accompanying diagram, the process of obtaining the relatively concentrated $SO_2$ solution may be combined with other steps involving the treatment of the copper ore. The fresh wash solution, which makes up the loss in the tailings, etc., mixed with the lime needed in the lixiviation and precipitation is passed through a third or safety tower or absorber and absorbs the $SO_2$ escaping from the second or weak solution tower, thus cutting off all escape of $SO_2$. The solution from the safety tower is then added to the barren, unsaturated mill solution and together, they are passed through the second tower or absorber, thereby producing a relatively weak $SO_2$ solution. The gas supplied to this second tower may come from the same roaster or sulfur burner which supplies the $SO_2$ to make up for losses in the lixiviating and precipitating process; also supplied to the second tower, is the gas escaping from the first or strong tower or absorber. From the weak tower, the solution is next passed through the strong tower or absorber and saturated therein to the desired strength. Very strong or relatively pure $SO_2$ gases are supplied to this first or strong tower from the boiler and precipitate roaster, hereinafter mentioned. In practising the foregoing method, a strong or relatively concentrate solution of $SO_2$ is secured. Furthermore, all escape involving loss of $SO_2$ is cut off. Obviously, more than three towers or absorbers might be used in the series, for example, in the case where gases from different parts of the apparatus for the treatment of the ore are of such strength that it would be more advantageous to absorb them in separate parts of the absorption apparatus than to mix them before absorption. In most cases, however, three towers or absorbers, as illustrated, are sufficient, though four of them might be used to advantage where a dilute roaster gas is supplied to the mill.

*Agitation of the ore and $SO_2$ solution and the supplying of $SO_2$ during the agitation while the copper is passing into solution.*

In order to secure rapid solution of the copper, to prevent excessive reprecipitation and resolution, and to secure a rich copper solution, efficient agitation of the pulp is necessary. During agitation some $SO_2$ is used, usually by combining with the copper, and this loss is made up by supplying practically pure $SO_2$ gas to the pulp during agitation. Agitation of the pulp is preferable to ordinary leaching methods because the copper passes much more rapidly into solution than when leaching is employed. In leaching, the $SO_2$ first dissolves the copper and then, as the solution becomes depleted of its $SO_2$, the copper is precipitated, as shown by the following equation:—

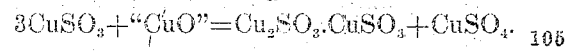
$3CuSO_3 + "CuO" = Cu_2SO_3.CuSO_3 + CuSO_4.$

The result is a process of solution and precipitation, and resolution and reprecipitation, as the solution passes through the charge, thereby forming much copper sulfate $CuSO_4$. This can be avoided only by an efficient agitation of the pulp while the copper is passing into solution. To avoid reprecipitation and slowing down of the rate of solution, very strong or relatively pure $SO_2$ gas must be added during the solution process, and addition of $SO_2$ can be done effectively only while the pulp is being agitated.

*Efficient separation of the pregnant solution from the lixiviated ore.*

The pregnant solution must be separated from the ore without too much loss of $SO_2$, in order to avoid reprecipitation. For this purpose, a counter-current system which will handle the slimes and sands efficiently is the best method as the precipitation from the pregnant solution is complete. Preferably, the barren solution, after the precipitate has been removed, enters the last decantation or washing tank of the counter-current system, as wash solution. The rich pregnant solution is taken off from the first decantation tank or washer of the system. This separation and washing is best accomplished in covered decantation tanks for the slimes and inclosed sand drags for the sands.

*Efficient removal of the $SO_2$ from the pregnant solution.*

This should be accomplished as rapidly as possible in order to secure a clean crystalline precipitate, and is most efficiently done by the introduction of steam into the solution which not only heats the solution but also keeps it in violent agitation or ebullition, thereby aiding very materially in the removal of the $SO_2$.

*Precipitation of the copper from the copper sulfate.*

In the boiling operation above mentioned copper sulfate is formed, as represented by the following equation:

$$4CuSO_3 = Cu_2SO_3.CuSO_3 + CuSO_4 + SO_2.$$

The precipitation of the $CuSO_4$ is one of the most important features of the process as only about 75% of the copper is precipitated as the cupro-cupric sulfite in an ordinary boiling operation, while the remainder, approximately 25%, is left in solution as copper sulfate. Precipitation by means of scrap iron, hydrogen sulfid, or by electrolysis are out of the question in most places where the process would be used, and do not lend themselves to the process in a satisfactory manner from a metallurgical standpoint as they would result in the formation of $H_2SO_4$ and more $CuSO_4$ which would finally destroy the process, so far as the recovery of copper is concerned, by converting it into a sulfuric acid or sulfate process. It is of great importance that all the copper be secured as the cupro-cupric sulfite and that the sulfate be removed from the solution. The method of accomplishing this in the process is extremely simple and efficient. It consists in the introduction of the proper amount of a lime compound such as lime or limestone into the solution at some time during each cycle of the process, with the result that all the copper is precipitated as the red cupro-cupric sulfite and the sulfate is removed from the solution as it is formed. The lime or limestone forms calcium bisulfite, $Ca(HSO_3)_2$, in the strong solution of $SO_2$, and the calcium bisulfite reacts with the $CuSO_4$ to form calcium sulfate and copper sulfite as follows:

$$CuSO_4 + Ca(HSO_3)_2 \rightarrow CuSO_3 + CaSO_4 + H_2SO_3$$

It may be proved mathematically that approximately enough lime to take care of one third of the copper according to the above equation should be used.

The required amount of lime or limestone may be added with the ore, in the absorption apparatus, or just before boiling. In most cases, however, it is best to add the lime, as previously stated, with the fresh solution or water in the safety tower. This results in cutting off all escape of $SO_2$, and prevents the dilution of the $SO_2$ gases with $CO_2$ if limestone is added with the ore, or impoverishment of the solution in $SO_2$ if lime or limestone is added with the ore. The lime or limestone may be added, however, at other stages of the process.

It may be advantageous to add the finely ground limestone to the hot barren solution after the boiling and the cupro-cupric sulfite has settled out. The remaining copper may then be precipitated as a green basic sulfate, as shown below, mixed with the calcium sulfate.

$$4CuSO_4 + 3CaCO_3 = 3H_2O + CuSO_4.3Cu(OH)_2 + 3CaSO_4 + 3CO_2$$

This mixed precipitate may be returned to the head of the mill or apparatus for retreatment, or if desired, may be treated separately with a dilute $SO_2$ solution for the recovery of the copper as cupro-cupric sulfite. If treated with dilute $SO_2$ solution in large enough quantity all the copper may be dissolved without bringing much of the calcium sulfate into solution.

Another method of carrying out the precipitation which has the advantage that 75% of the copper is secured in the pure sulfite and only 25% is mixed with the calcium sulfate is to add the lime as a solution of calcium bisulfite to the hot solution, which carries the remaining copper as the sulfate, after the first boiling operation. The remaining copper is then changed to the sulfite, as shown below, and finally precipitated as the cupro-cupric sulfite as the remaining $SO_2$ is boiled off.

$$CuSO_4 + Ca(HSO_3)_2 \rightarrow CuSO_3 + CaSO_4 + H_2SO_3$$

The place in the cycle at which the limestone or lime is introduced will depend upon the use to which the copper product is to be put and the purity of the product desired. In any case the precipitation of the copper will be complete and all the copper will be secured as the cupro-cupric sulfite.

*Roasting of the precipitated sulfite.*

This is done to prevent loss of sulfur, to secure a rich $SO_2$ gas for saturating the barren solution from the boiler and to secure as high a grade product as possible for shipment or smelting. The nature of the sulfite precipitate makes possible the meeting of these requirements in a most satisfactory way. In order to secure a rich gas and avoid the formation of much $CuSO_4$ the roasting operation should be conducted without access of air. Roasting the precipitate in this manner for ten minutes at 400 C. is sufficient to decompose the sulfite and release the $SO_2$ as shown in the following equation:

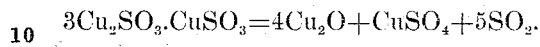
$$3Cu_2SO_3 \cdot CuSO_3 = 4Cu_2O + CuSO_4 + 5SO_2.$$

To avoid the formation of the $CuSO_4$ a little carbon is added and roasting without access of air for fifteen minutes at 600 C. gives no $CuSO_4$ but only $Cu_2O$ and $SO_2$ as shown by the following equation:

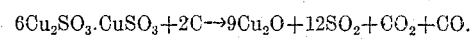
$$6Cu_2SO_3 \cdot CuSO_3 + 2C \rightarrow 9Cu_2O + 12SO_2 + CO_2 + CO.$$

This prevents any loss of sulfur in the precipitate, gives a rich $SO_2$ gas, and gives the highest grade product possible, excepting the metal.

Treatment of the calcium sulfate.

The strong $SO_2$ solutions dissolve more $CaSO_4$ than does water and therefore, when the $SO_2$ is driven off this excess of $CaSO_4$ is precipitated along with the cupro-cupric sulfite. The separation of the two precipitates is very simple as the cupro-cupric sulfite is heavy and crystalline and the $CaSO_4$ is very light and slimy. They are therefore very easily separated in a suitable spitzkasten. As I discovered some time ago, the cupro-cupric sulfite floats quite readily and may be separated from the $CaSO_4$ by means of flotation.

Conservation of the heat in the process.

As much as possible of the heat in the barren solution from the boiler and settler should be transferred to the pregnant solution before boiling in order to avoid the use of too much steam in the boiling operation. This transfer of heat is readily carried out in a heat interchanger through which the solutions flow in opposite directions in separate compartments separated by conducting walls. The heat flows through the conducting walls from the hot barren solution to the cold pregnant solution.

Cooling of the mill solution.

This is absolutely necessary in order that the solution may hold the required amount of $SO_2$, as the amount of $SO_2$ which water will hold in solution decreases rapidly with rise in temperature. This cooling is easily done in a cooling tower or other form of cooling apparatus.

The above are the essential steps of the process which is carried out in a general way as follows:

The ore, ground to the required mesh, usually quite coarse, is agitated from fifteen minutes to two hours with the relatively concentrated $SO_2$ mill solution from the strong tower or absorber. During the agitation concentrated, i. e., practically pure $SO_2$ gas from the boiler or precipitate roaster or both is forced through the pulp to make up for the $SO_2$ consumed in dissolving the copper. From the agitator the pulp flows to the decantation and washing or filtering plant where the pregnant solution is separated from the ore. The pregnant solution then flows to the counter-current heat exchanger, where it absorbs some of the heat from the hot barren solution. From the heat exchanger, the warm pregnant solution flows to the boiler where the $SO_2$ is expelled by applying steam to the solution. Here all the copper is precipitated as the red cupro-cupric sulfite. From the boiler the hot barren solution carrying the copper sulfite precipitate and the precipitated calcium sulfate flows to a spitzkasten or to a flotation cell of any preferred type, where most of the $CaSO_4$ is separated from the copper precipitate. From the spitzkasten or cell the hot barren solution flows to the heat exchanger where part of its heat is transferred to the incoming pregnant solution. The partly cooled barren solution next flows to the cooling apparatus and after being cooled to the desired temperature flows to the last tank or drag of the counter-current decantation and washing system, or to the filtration plant where it is used for washing out the $CuSO_3$ held in the pulp. Finally, the cooled barren solution flows to the second or weak absorption tower or absorber. Before passing through this tower or absorber it is joined by the water entering the mill to make up the moist-loss in the tailings, etc., this water having first been mixed with enough lime to effect one cycle of the process and passed through the third or safety tower or absorber, to absorb the $SO_2$ from $SO_2$ gases escaping from the second tower or absorber. The mixed solutions pass through the second tower or absorber taking up most of the $SO_2$ which is supplied from a sulfur burner or roaster to make up for the $SO_2$ lost in the process. From the second tower or absorber the solution passes through the first or strong $SO_2$ tower or absorber into which the strong gases from the boiler and roaster, which have not been used up in the agitator, are passed. The residual gases from the strong tower or absorber pass into the weak tower or absorber along with the relatively weak gases supplied from the sulfur burner or roaster and the residual gases from the weak tower pass through the safety tower or absorber, which might be considered an extension of the weak tower. The relatively concentrate $SO_2$ solution from the strong tower or absorber passes into the agitator along with fresh ore and so on through the mill again. The lime needed in the process may not be added in the safety tower, though in most cases this will be advantageous, but may be added as lime or limestone with the ore, to the solution before or after boiling, or as a solution of calcium bisulfite before or after boiling. The place and manner of addition will depend upon local conditions. The cupro-cupric sulfite, after being separated from the calcium sulfate formed, is settled or filtered out of the barren solution and sent to the roaster where it is roasted with the required amount of carbonaceous material and without access of air giving a strong $SO_2$ gas and a very high grade copper product which may be shipped to the smelter or refinery or smelted in a reverberatory furnace with carbon and a copper bullion secured. This is only a general description of the manner of operating the process and many slight variations may be made depending upon the nature of the ore, the point at which the lime or limestone is added, and the particular kind of apparatus used in the different departments of the mill.

As is readily seen from the above brief description, the process differs from all other processes, which aim to use a solution of $SO_2$ for the treatment of copper ores, in all the divisions or parts of the process given below, each of which parts is an improvement over the older processes. It should also be noted how efficiently each of these steps links with the others to make a complete process in every detail.

These improvements are the following: The use of a relatively concentrated $SO_2$ solution, the lack of which renders the process cumbersome, inefficient and impracticable, and which cannot be secured from dilute gases in the manner hitherto used. The manner of securing said relatively concentrated $SO_2$ solution by subdividing the absorption apparatus and supplying gases of different strengths to the different sections of the apparatus as described. The use of the concentrated gases from the roasting and boiling operations in a separate section of the absorption apparatus in order to secure the strong solution needed. The use of lime or limestone in the process in order to secure all the copper in the form of a cupro-cupric sulfite precipitate, a very vital part of the sulfite process and the lack of which was one of the main causes of failure in previous attempts to use this solvent. The use of the limestone or lime in the process removes the sulfate from the solution, which, if not removed, means the destruction of the process as a sulfite process. As will be noted from the foregoing description, either lime or limestone may be used and may be added at any point in the cycle of treatment and the result will be that all the copper will be precipitated as the cupro-cupric sulfite and the sulfate will be removed from the solution as calcium sulfate. Thus, the lime compound may be added with the ore, may be added in the absorption apparatus, may be added to the pregnant solution, may be added to the hot solution from the boiler and the precipitate formed returned for retreatment. In each case the result is the same, i. e., the copper is all secured as the cupro-cupric sulfite precipitate and the sulfate is removed from the solution. From a chemical standpoint it makes little difference at what point the lime or limestone is added as to its use for the above purposes. As is readily seen it may be advantageous to add the lime or limestone at some particular point for other reasons and in most cases it will be found advantageous to add it as mentioned in the next item, the use of the lime or limestone needed in the process in the absorption apparatus as described to prevent loss of $SO_2$. The roasting of the sulfite precipitate as described in order to secure a rich $SO_2$ gas, prevents loss of sulfur, and secures the richest copper product possible. It should be here noted that this roasting operation utilizes some newly discovered properties of the cupro-cupric sulfite:—the separation of the calcium sulfate from the sulfite precipitate, an important item if a very high grade product is desired or if freight and hauling charges are very high; the heating of the pregnant solution by the transfer of heat from the hot barren solution in order to avoid too much dilution with steam in the boiling operation and also to conserve the heat as much as possible; the special cooling of the solution without which it would be impossible to secure the relatively concentrated $SO_2$ solution needed.

From the above description the simplicity and efficiency of the process are apparent, the most noticeable features being the small chemical cost, the completeness of the precipitation, and the high grade product. The special applicability of a counter-current system to the separation of the pregnant solution from the ore and the washing of the tailings is also an item of interest. Tests of the process have given most excellent results, some oxidized ores yielding as high as 99% of the copper in a fifteen minute treatment and giving a product carrying over 85% copper. Roasted sulfid also gives good results. The relatively low cost of the plant necessary for the process, and the simplicity and cheapness of operation, due to the relatively coarse grinding necessary, the short time of treatment, and the completeness of the precipitation, and the simple roasting operation necessary, are readily appreciated when a plant is being designed.

Though I have described a preferred way of carrying out the process, I do not wish to be limited by the brief outline possible in a patent specification, as it is evident that a great many minor changes might be made without altering the main features of the process. I, therefore, desire to be limited as to the different steps and the process as a whole only by the description as interpreted in the appended claims. No drawings are given as the process is not dependent in any of its divisions upon any particular form of apparatus, and the description given is sufficiently clear and detailed that any competent metallurgist or any one familiar with the art of metallurgy in any detail, can apply the process to any ore to which it is suited.

What is claimed is:—

1. The process which consists in lixiviating copper ores with a concentrated $SO_2$ solution made by first bringing the solution in contact with relatively weak $SO_2$ gases and then successively bringing the same solution in contact with successively stronger $SO_2$ gases in separate absorbers.

2. A copper ore treating process wherein the precipitate is roasted and the $SO_2$ gas driven off, which consists in agitating the ore in a concentrated solution of $SO_2$ gas and passing very strong $SO_2$ gases from the precipitate roasting operation of the process through the pulp during said agitation and thereafter absorbing the remaining $SO_2$ in said strong gases in a relatively weak $SO_2$ solution and in enriching said solution to make the aforesaid concentrated $SO_2$ solution for the treatment of more ore.

3. A copper ore treating process wherein the pregnant solution is boiled to effect precipitation and production of $SO_2$ gas, which consists in agitating the ore in a concentrated solution of $SO_2$ and passing the practically pure $SO_2$ gases from the boiling operation of the process through the pulp during said agitation and thereafter absorbing the remaining $SO_2$ in said gases in a relatively weak $SO_2$ solution and in enriching said solution to make the aforesaid concentrated $SO_2$ solution for the treatment of more ore.

4. A copper ore treating process wherein the pregnant solution is boiled to effect precipitation and production of $SO_2$ gas and the precipitate roasted and $SO_2$ gas driven off, which consists in agitating the ore in a concentrated solution of $SO_2$ and passing the very strong gases from the precipitate roasting operation and the practically pure $SO_2$ gases from the boiling operation of the process through said ore and solution during agitation and thereafter absorbing the remaining $SO_2$ in said gases in a relatively weak $SO_2$ solution and in enriching said solution to make the aforesaid concentrated $SO_2$ solution for the treatment of more ore.

5. The process of lixiviating copper ores with an $SO_2$ solution to which a lime compound has been added.

6. The process of lixiviating copper ores with an $SO_2$ solution containing calcium bisulfite.

7. The step in the process of treating copper ores with an $SO_2$ solution for the recovery of the copper which consists in adding a lime compound to the mill solution during the process in order that all the copper may be secured as copper sulfite.

8. The step in the process of treating copper ores with an $SO_2$ solution for the recovery of the copper which consists in adding a lime compound to the mill solution during the process in order to secure all the copper as copper sulfite and to precipitate the sulfate as calcium sulfate and adding said lime compound at the exit end of the $SO_2$ absorption system in order to prevent loss of $SO_2$.

9. The process of treating successive batches of copper ores with an $SO_2$ solution for the recovery of the copper, which consists in lixiviating the successive batches of ore with the solution and in adding enough of a lime compound during each successive use to cause substantially all the copper to be precipitated from the pregnant solution as a copper sulfite compound when the excess $SO_2$ is removed from said pregnant solution.

10. In the process of treating copper ores with an $SO_2$ solution for the recovery of the copper the addition of a lime compound in quantity sufficient to cause substantially all of the copper to be precipitated as a copper sulfite compound and all the sulfate combined with copper to be precipitated as calcium sulfate when the excess $SO_2$ is removed from the pregnant solution.

11. In the process of treating copper ores with the cycle use of an $SO_2$ solution for the recovery of the copper wherein the $SO_2$ solution is enriched by the absorption of $SO_2$ gas during each cycle of use the addition of enough of a lime compound during each cycle of use to cause substantially all the copper to be precipitated as a copper sulfite compound and substantially all the sulfate combined with copper to be precipitated as calcium sulfate when the excess $SO_2$ is removed from the pregnant solution, said lime compound being added at the head of the absorption system in order to prevent loss of $SO_2$.

12. The process of treating copper ores for the recovery of the copper, which consists in roasting copper sulfite precipitate without access of air, passing the very strong $SO_2$ gases from this roasting operation through the solution and ore during agitation of the latter and then bringing said gases in contact with a relatively dilute $SO_2$ solution in order to make the concentrated solution for lixiviating the ore.

13. The step in the process of treating copper ores with $SO_2$ for the recovery of the copper which consists in roasting copper sulfite without access of air and in the presence of carbonaceous material for the production of the $SO_2$ vapor.

14. The process of treating copper ores for the recovery of the copper, which consists in roasting the copper sulfite precipitate without access of air and in the presence of carbonaceous material, passing the very strong $SO_2$ gases from this roasting operation through the solution and ore during agitation of the latter, and then bringing said gases in contact with a relatively dilute $SO_2$ solution to make a concentrated solution for the lixiviation of more ore.

15. The process of treating copper ore for the recovery of the copper, each cycle of which consists in making a relatively dilute $SO_2$ solution by bringing cold barren solution in contact with relatively dilute $SO_2$ gases supplied to the process from an external source, making a concentrated $SO_2$ solution by bringing aforesaid relatively dilute solution in contact with very strong $SO_2$ gases from the roasting and boiling operations after said gases have been passed through a mixture of concentrated solution and ore while said mixture is being agitated, lixiviating ore by agitating it with first mentioned concentrated $SO_2$ solution, passing very strong $SO_2$ gases from the roasting and boiling operations through last said ore and solution while they are being agitated, separating the pregnant solution from the lixiviated ore, heating said pregnant solution by transferring heat to it from hot barren solution, boiling off the excess $SO_2$ from aforesaid heated pregnant solution and precipitating the copper as a copper sulfite compound, separating said precipitate from the hot barren solution, roasting said precipitate without access of air and in the presence of carbonaceous matter, passing the gases from the roasting and boiling operations on for further use in the process as described, cooling the last mentioned barren solution by transferring some of its heat to pregnant solution, further cooling said barren solution by contact with a current of air, passing said cooled barren solution on for use in the next cycle of the process, and adding a lime compound to the solution during each cycle of the process.

16. The process of treating copper ore for the recovery of the copper, each cycle of which consists in making a relatively dilute $SO_2$ solution by bringing cold barren solution containing a lime compound in contact with relatively dilute $SO_2$ gases supplied to the process from an external source, making a concentrated $SO_2$ solution by bringing aforesaid relatively dilute solution in contact with very strong $SO_2$ gases from the boiling and roasting operations after said gases have been passed through a mixture of concentrated $SO_2$ solution and ore while said mixture is being agitated, lixiviating ore by agitating it with the first mentioned concentrated $SO_2$ solution, passing very strong $SO_2$ gases from the roasting and boiling operations through said ore and solution while said ore and solution are being agitated, separating the pregnant solution from the lixiviated ore, heating said pregnant solution by transferring heat to it from hot barren solution, boiling off the excess $SO_2$ from the aforesaid pregnant solution and precipitating the copper as a copper sulfite compound, separating said precipitate from the hot barren solution, roasting said precipitate without access of air and in the presence of carbonaceous matter, passing the gases from the roasting and boiling operations on for further use in the process as described, cooling the last mentioned barren solution by transferring some of its heat to pregnant solution, further cooling said barren solution by contact with a current of air, adding a lime compound to said cooled barren solution, and passing on said barren solution containing said lime compound for further use in the next cycle of the process.

17. The process of treating copper ore, which consists in lixiviating the ore with a concentrated $SO_2$ solution, separating from the lixiviated ore the pregnant solution thereby obtained, boiling the pregnant solution to drive off $SO_2$ from the pregnant solution and effect precipitation of the copper as cupro-cupric sulfite, and roasting the precipitated cupro-cupric sulfite without access of air to drive off the $SO_2$ from the copper.

18. The improvement in the art of treating copper ore for the recovery of the copper, which consists in lixiviating the ore with a concentrated $SO_2$ solution to which has been added a lime compound, adding $SO_2$ to the ore and solution during the lixiviation, agitating the ore and solution during the lixiviation, separating from the lixiviated ore the pregnant solution thereby obtained, and driving off the $SO_2$ from the pregnant solution, thereby effecting precipitation of the copper as cupro-cupric sulfite.

19. The improvement in the art of treating copper ore for the recovery of the copper which consists in lixiviating the ore with a concentrated $SO_2$ solution to which has been added a lime compound, adding $SO_2$ to the ore and solution during the lixiviation, agitating the ore and solution during the lixiviation, separating from the lixiviated ore the pregnant solution thereby obtained, driving off the $SO_2$ from the pregnant solution thereby effecting precipitation of the copper as cupro-cupric sulfite, separating the cupro-cupric sulfite from the barren solution, and roasting the precipitated cupro-cupric sulfite to drive off $SO_2$ from the copper.

20. The process of treating copper ore, which consists in agitating said ore with a concentrated $SO_2$ solution and passing concentrate $SO_2$ gas into the ore and solution during the agitation thereof.

21. The improvement in the art of lixiviating copper ore with an $SO_2$ solution which consists in adding a lime compound whereby all the copper is precipitated as cupro-cupric sulfite.

22. The step in the art of treating copper ore for the recovery of the copper which consists in roasting cupro-cupric sulfite with carbonaceous material and without access of air.

23. The process of treating copper ore, which consists in lixiviating the ore with a concentrated $SO_2$ solution, separating from the lixiviated ore the pregnant solution thereby obtained, boiling the pregnant solution to drive off $SO_2$ from the pregnant solution and effect precipitation of the copper as cupro-cupric sulfite, and utilizing the hot barren solution to heat the pregnant solution before the boiling operation.

24. The process of treating copper ore, which consists in lixiviating the ore with a concentrated $SO_2$ solution, separating from the lixiviated ore the pregnant solution thereby obtained, boiling the pregnant solution to drive off $SO_2$ from the pregnant solution and effect precipitation of the copper as cupro-cupric sulfite, and effecting a heat transfer between the hot barren solution and the pregnant solution before boiling the latter.

NIELS C. CHRISTENSEN.

Witnesses:
A. M. CHENEY,
LOUISE WEER.